(12) United States Patent
Brown

(10) Patent No.: US 8,476,574 B1
(45) Date of Patent: Jul. 2, 2013

(54) METHOD OF DECONVOLUTION OF SPECTRAL DATA

(75) Inventor: Chris Brown, Gilbert, AZ (US)

(73) Assignee: Mutoh Industries Ltd., Tokyo (JP)

( * ) Notice: Subject to any disclaimer, the term of this patent is extended or adjusted under 35 U.S.C. 154(b) by 316 days.

(21) Appl. No.: 13/077,823

(22) Filed: Mar. 31, 2011

(51) Int. Cl.
*H01J 5/16* (2006.01)

(52) U.S. Cl.
USPC ............ 250/226; 250/216; 356/319; 356/326

(58) Field of Classification Search
USPC ........... 250/226, 216, 208.2, 214 C; 356/300, 356/319, 320, 326, 451
See application file for complete search history.

(56) References Cited

U.S. PATENT DOCUMENTS

| | | | |
|---|---|---|---|
| 4,200,931 A | 4/1980 | Duinker | |
| 4,892,405 A * | 1/1990 | Sorensen et al. | 356/243.8 |
| 5,144,498 A * | 9/1992 | Vincent | 359/885 |
| 5,994,690 A | 11/1999 | Kulkarni et al. | |
| 6,058,357 A | 5/2000 | Granger | |
| 6,514,277 B1 | 2/2003 | Lilge et al. | |
| 6,788,394 B1 | 9/2004 | Garcia-Rubio et al. | |
| 7,027,134 B1 | 4/2006 | Garcia-Rubio et al. | |
| 7,280,203 B2 | 10/2007 | Olschewski | |
| 7,496,463 B2 | 2/2009 | Nicoli et al. | |
| 7,633,051 B2 | 12/2009 | Ehbets | |
| 7,652,792 B2 | 1/2010 | Honeck et al. | |
| 2007/0216918 A1 | 9/2007 | Honeck et al. | |
| 2010/0165118 A1 | 7/2010 | Honeck et al. | |

* cited by examiner

*Primary Examiner* — Kevin Pyo
(74) *Attorney, Agent, or Firm* — Cahill Glazer PLC

(57) ABSTRACT

A method for improving the analysis of spectral data wherein light is directed through a linearly variable bandpass filter to impinge on a linear array of photodetectors. The ratio of the passband captured by a target detector to the passband captured by adjacent detectors is determined and used to calculate the amount of light to add back to the amount reported by the target detector. The value of the stored information from each target detector is then adjusted by subtracting from that detector what was added to adjacent detectors.

7 Claims, 8 Drawing Sheets

Obtain raw pixel values, $P_{(\lambda)}$ and populate the *Raw Pixel Array*, $P_{(\lambda)[n]}$ by sampling each pixel of the photodiode array via the analog-to-digital converter. The raw pixel array is a numeric array used to temporarily store the values associated with each pixel, for deconvolution processing.

↓

Subtract dark current, $P_{(\lambda)[n]} - DC_{(\lambda)[n]}$ and update raw pixel array. $DC_{(\lambda)}$ may be a single value, or a numeric array of values, one per pixel. DC represents the "noise" associated with a given pixel when no light is present; this step removes the dark current noise prior to deconvolution.

↓

Calculate out-of-band luminous noise, $P_{(\lambda)OOB[n]} = P_{(\lambda)[n]} / \%T_{(\lambda)Ne}$ to compensates for light transmission through the etalon. $\%T_{(\lambda)Ne}$ represents the normalized *out-of-band* light transmittance ($\%T_{OOB}$) for the etalon, which is all of the light passing through any point on the etalon that is not the desired waveband for that point; i.e. all light except for the waveband of interest.

↓

Calculate total out-of-band, $OOB = \Sigma\, P_{(\lambda)OOB[n]} / (\,n\, /\, \%R_E)$ which is the cumulative effect of all out-of-band wavebands for any given pixel. The impact of out-of-band luminous noise is directly related to the spectral energy of the light striking the etalon, and the responsivity of the pixels.

↓

Calculate spectral responsivity of the photodiode array, $\%R_{(\lambda)S}$ which is a numeric array representing the relative responsivity of any given pixel to the waveband associated with the position of said pixel along the length of the etalon; this is derived in advance.

↓

Calculate passband, $P_{pb(\lambda)[n]} = (P_{(\lambda)[n]} - (OOB / \%R_{(\lambda)S})) * \%R_{(\lambda)S}$ for each pixel. To do this, calculate the influence of neighboring pixels, and subtract from the target pixel after first adjusting the target pixel value to compensate for energy lost to neighboring pixels (*see pseudo code*):

$$P_{sum(\lambda)[n]} = P_{(\lambda)[n]} + e((-1 * ((\lambda - (\lambda_i * \lambda_o)) - \lambda)^2) / ((\lambda_{hpbw} / 2)^2))$$

...and..

$$P_{sum(\lambda)[n]} = P_{(\lambda)[n]} - e((-1 * ((\lambda - (\lambda_i * \lambda_o)) - \lambda)^2) / ((\lambda_{hpbw} / 2)^2))$$

METHOD OF DECONVOLUTION OF SPECTRAL DATA

CROSS-REFERENCE TO RELATED APPLICATION

This application is related to non-provisional application entitled "SPECTROPHOTOMETER AND METHOD" filed Dec. 23, 2009 and assigned Ser. No. 12/594,249.

FIELD OF THE INVENTION

The present invention is directed to the spectral analysis of received light, and more specifically is directed to the derivation of a digital representation of the properties of received light.

BACKGROUND OF THE INVENTION

The present invention is directed to the collection and manipulation of spectral data. The collection of spectral data relating to color measurement or color analysis such as systems found in spectrophotometers and the like frequently incorporate inherent errors in the data presentation. Spectrophotometers and similar apparatus utilized for the analysis of spectral data frequently incorporate techniques to accurately present a digital representation of the analog values measured by intercepting radiated or reflected light; however, the many variable that are imposed on such systems usually result in an imperfect digital representation of the data derived from the received light. The present invention is directed to a method for improving the derivation of digital information to more accurately represent the received light by deconvoluting data collected during the analysis.

SUMMARY OF THE INVENTION

The method of the present invention may be described with the assistance of a description of a spectrophotometer with which the method may be used. therefore, reference is made to copending application Ser. No. 12/594,249, assigned to the Assignee of the present application, which application is incorporated herein by reference. The referenced application describes a spectrophotometer that may embody the present method. A spectrometer may incorporate a 128-pixel chipscale linear photodiode array, epoxy bonded to a linearly variable bandpass filter (referred to also as an "etalon" in technical documents), and to a fiber optic faceplate comprising randomly distributed 50 μm EMA (extra mural absorption) layered clad glass fibers of low numerical aperture (referred to also as a "collimating faceplate" in technical documents). The linearly variable bandpass filter, or etalon, is a thin, narrow glass window onto which a complex interference coating has been applied; this filter acts very much like a traditional interference filter wedge as described in the book "Color Science, Concepts and Methods, Quantitative Data and Formulae" Second Edition, by Wyszecki and Stiles (chapter 1, sections 1.3.7 and 1.3.8). Pages 46 and 47 discuss a typical filter wedge; in the case of the present sensor, each pixel of the photodiode array corresponds to a unique "slit" position as described in the book. To summarize the process of pixel deconvolution, we start by calculating the ratio of the passband captured by the target pixel to the passband captured by adjacent pixels. A Gaussian function is used to calculate the amount of light to "add back" to the amount reported by the target pixel. This is the first step of the method. In the second step, an amount of light is subtracted from the target pixel that had been added to the adjacent pixels. The net result is a redistribution of the overlapping passbands and a "sharpening" of the spectral data.

BRIEF DESCRIPTION OF THE DRAWINGS

The present invention may more readily be described by reference to the accompanying drawings in which:

FIGS. 13A and 13B present a flow chart showing the handling of spectral data including the method of the present invention to deconvolve collected spectral data.

DETAILED DESCRIPTION OF THE INVENTION

Figure 1:
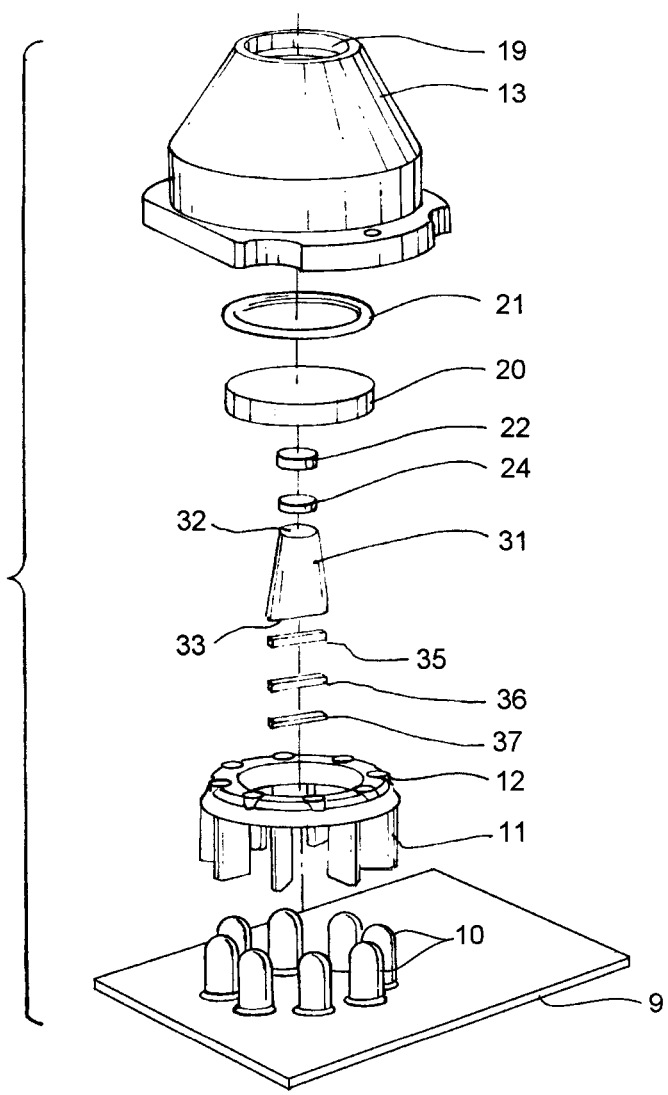
FIG. 1 is an exploded view of a schematic representation of a spectrophotometer construction useful to explain the method of the present invention.

The method of the present invention may more readily be described by reference to apparatus in which the method may be used. Referring to FIG. 1, an exploded view of a schematic representation of a portion of a spectrophotometer is shown useful for describing the method of the present invention. A printed circuit board 9 supports components required for the signal handling of the signals produced by the detection and measurement of light energy. A plurality of LEDs 10 are shown arranged in a circular array and positioned within mounting bracket 11 having LED apertures 12 positioned in correspondence with the respective LEDs. The LEDs are energized to provide a selected output intensity. Light from the LEDs pass through corresponding apertures 12 and enter a diffuser collar to impinge on the interior of an aperture cone 13. The diffused light exiting the aperture 19 strikes an intended target resulting in reflected light passing through a protective lens 20 secured to the interior of the aperture cone by a sealing O-ring 21. The light passes the protective lens 20 and the reflected light strikes a diffuser lens 22 and is then directed to and encounters a trim filter 24 used to filter undesired wavelengths such as infrared or ultraviolet from the reflected light. The diffused and trimmed reflected light passes through a fiber optic member 31 and "reshapes" the light path from the input aperture 32 to an essentially rectangular output aperture 33. The output aperture 33 is shaped to correspond to a photo detector 37. The light thus passes from the rectangular output aperture 33 and is collimated in collimator 35. The collimated light passes through a linear variable filter 36 to provide wavelength outputs that vary linearly along the length of the filter. The light passing through the linear variable filter is thus converted into its constituent spectra that impinges on a photo detector array 37 to provide signals derived therefrom corresponding to predetermined wavelength constituents of the reflected light.

The light is collected through the fiber optic strands which are fused or formed into a shape at one end that may be roughly equal in length and width to that of a spectral sensor. The spectral sensor acts as a digital prism converting polychromatic light into its constituent spectra which may include visual spectrum white light between 350 and 750 nm wavelength, near infrared light of between 750 and 1,500 nm, far infrared above 1,500 nm wavelength and ultraviolet light below 350 nm wavelength. The spectral sensor assembly will incorporate three main subcomponents: first, an array of light sensitive photo detector sights, which may include photodiodes, phototransistors, or other similar such light detecting circuitry consistent with the wavelength regions of interest, and consisting of multiple photo sights arranged in linear array in a roughly rectangular grouping in which rows of photo sights compose a long axis and columns the short axis; second, a wedged etalon or an interference filter wedge, formed of multiple band-pass filter coating layers applied so that composite interference coating layer thickness varies edge-to-edge to form a wedge-like shape at sub-micron scale along the long axis of the photodetector array, and wherein the center wavelength of each pass band is a function of the coating thickness, so that the peak wavelength transmitted through the filter at any given point will vary roughly in a linear fashion in the direction of the filter coating wedge; and, third, a collimating face plate comprising an array of optically transparent plastic or glass fiber-optic elements on the scale of 5 to 100 microns diameter, with similar center-to-center spacing and of a low numeric aperture combined with some ratio of extra mural absorption material, or similarly a monolithic plate of light absorbing material, in which an array of holes or capillaries on the scale of 5 to 100 microns diameter and similar center-to-center spacing has been etched, drilled or otherwise cut to the light absorbing plate, and which the purpose of the face plate, of either fiber-optic or capillary array design, is to collimate the light incident on the interference filter coating.

Figure 2:
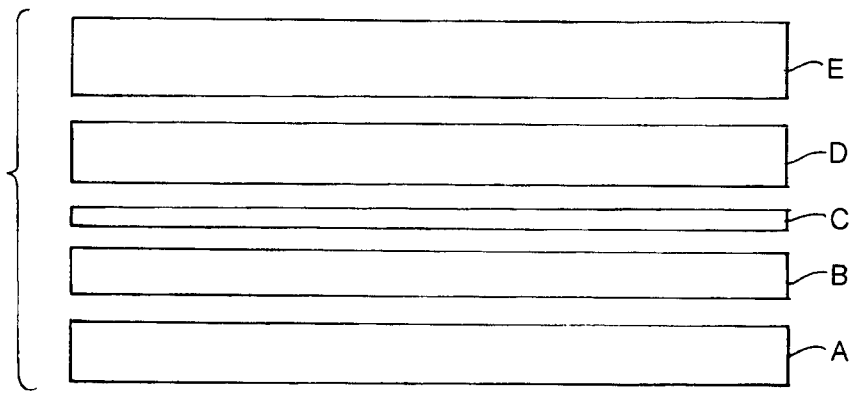
FIG. 2 is a schematic representation of a spectral sensor assembly useful in the description of the operation of the method of the present invention.
Figure 3:
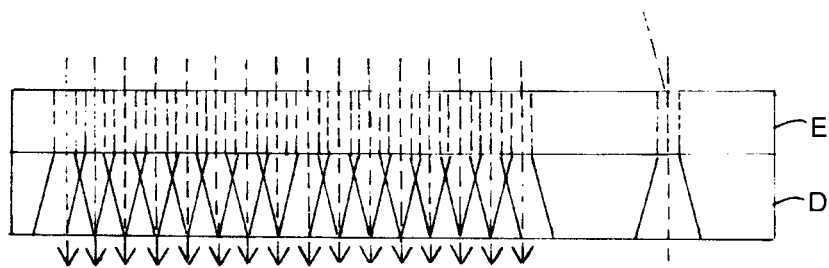
FIG. 3 is a partial cross-section of the collimating faceplate, shown in FIG. 2 in contact with a glass substrate, useful for describing the collimating of the faceplate used in the description of the present method.
Figure 4:
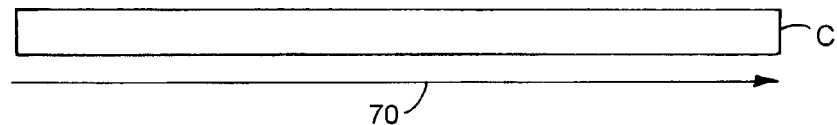
FIG. 4 is a schematic illustration of the interference filter wedge coating.
Figure 5:
FIG. 5 is a schematic representation of photodetector sites in a photodetector array.

A suitable schematic illustration of the spectral sensor assembly to which the method of the present invention may be applied is shown in FIG. 2. Referring now to FIG. 2, a schematic illustration of a spectral sensor assembly is shown. The assembly, for purposes of description, is shown schematically in separate layers; it will be understood that the assembly is formed into a unitary structure. A photo detector array A comprising a plurality of photo detector sites is in contact with a glass substrate B used to support an interference filter wedge coating C which in turn is contacted by a glass separation layer to which a collimating faceplate E is secured. The collimating faceplate E and glass separate layer D are shown in FIG. 3 wherein it may be seen that collimated light passing through the faceplate E passes through the glass separation layer D and is restricted to half angles of incidence of 20° or less. The light thus from the collimating faceplate passing through the glass separation layer strikes the interference filter wedge coating as shown in FIG. 4 and ultimately impinges on the photo detector array A as shown in FIG. 5. The linearly increasing thickness of the interference filter wedge coating in the direction of arrow 70 results in an operation upon impinging energy in a manner similar to a wedged etalon. The linearly increasing thickness of the coating performs the same function as a linearly increasing thickness of a wedged etalon. The collimating faceplate is designed with an acceptance half-angle of 20° or less. Greater detail and information of a suitable apparatus for use with the method of the present invention may be found in the above identified copending patent application which has been incorporated herein by reference.

With relatively high transmission efficiency, the fiber optic, or "collimating" faceplate acts to collimate (make parallel) incoming light striking the sensor assembly; given an NA (numerical aperture) of 0.2, the half-angle of light emerging from the faceplate is approximately 11.5 degrees (in air, relative to a zero degree angle of incidence to the sensor face). By the same token, the acceptance angle of incoming light is likewise 11.5 degrees. Light entering the fiber elements at angles greater than the half-angle (critical angle) will pass out the sides of the fibers to be captured and absorbed by the EMA layers. Light entering at angles less than the critical angle will exit the faceplate as a series of overlapping emergence cones, striking the etalon, to project a continuous spectrum onto, and spanning the length of the photodiode array (which has an active area of approximately 8.13 mm). The open area (OAR) ratio of the faceplate is approximately 70 percent, or 85 percent for the base fiber minus the EMA layers. The average slope of the etalon spanning the active area of the photodiode array is 39.5 nm/mm.

Light striking the interference coating of the etalon is reflected multiple times within the coating layers, simulating the optical effects of a Fabry-Perot interferometer. Because of the relatively short distance between the coating layers (i.e. boundary layers), the reflected light beams remain coherent with each other, resulting in optical interference. As the effective distance between boundary layers increases from the short wavelength (violet) to the long wavelength (deep red) edges, the wavelengths subject to constructive interference change in a nearly linear fashion, producing a continuous prism-like spectrum with no distinct breaks to cause moiré when projected onto the photodiode array (as can occur with diffraction gratings and step wedge filters).

The etalon does, however, exhibit its own unique peculiarities; namely, while the spectrum is itself continuous, it is also somewhat ambiguous when attempting to isolate the total passband energy for any given point (at a photodiode for example). This is due to certain attributes of interference filters in general. First, passband transmittance for any given point varies with wavelength, typically with greater transmission of longer wavelengths. Second, spectral transmittance in general is a function of incident angle, with decreasing transmittance as the incident angle shifts further from zero (relative to the sensor face). Third, increasing angles of incidence cause shifting to occur throughout the spectrum, resulting in the center wavelength of any given passband shifting toward the violet edge of the sensor. Fourth, each passband will have a bandwidth defined at its half-peak that is a function of its center wavelength, which for the photodiode assembly chosen for illustration is approximately 1.03 percent (but may be, as explained below, closer to 1.30 percent).

As an example, consider that at 550 nm (the approximate midpoint of the sensor) the half-peak bandwidth is approximately 5.67 nm, which translates into a physical width along the long axis of the sensor of 143.4 μm. Given a center-to-center pixel width of 63.5 μm, the half-peak for a 550 nm (peak) passband overlaps adjoining pixels by approximately 63 percent. As such, a significant portion of the passband energy falls outside the active area of the pixel; and, by the same token, energy from adjoining passbands overlaps the passband in question, resulting in a "blurring" of the passbands. Therefore, each pixel records a portion of its own passband energy, plus a portion of the energy of neighboring passbands, having the effect of dampening changes from one passband to the next. This passband overlap thus imposes deleterious effects on the spectral analysis of impinging light. To better visualize this phenomenon, imagine shining a single flashlight onto a wall in a darkened room; the light cone emerging from the flashlight will create a well-defined circle of illumination on the wall. Now, imagine adding two additional flashlights, one on each side of the first. The light cones emerging from the three flashlights will partially overlap, and the result will be what appears to be a line of light rather than three distinct circles of light. And, if the center flashlight outputs less light than the left and right, the overlapping cones will tend to increase the apparent luminous output of the center, minimizing the difference in luminous intensity from one edge of the line to the other.

Consider the following example: flashlights L(eft) and R(ight) emit 32 units of light each, while flashlight C(enter) emits 16 units, or 50%. We know that the light cone is wider than the active area of the pixel (the rectangular areas in the shown below), but the difference is identical for each flashlight. With no overlap, we would record values of 28, 14 and 28 units for L, C and R respectively. Each value, as well as the total units recorded is 87.5% what it should be; calibration is a simple matter of dividing each value by 0.875, because the ratio of L to C and R to C remains unchanged.

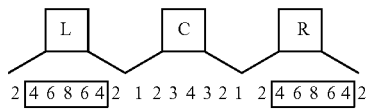

Now, overlap the cones so that each pixel sees the portion of the neighboring cone(s) that was unseen before. Doing this, we would record 29, 18 and 29 units for L, C and R. The ratio of L to C and R to C is now 62%. If we calibrate as we did before, this time by the difference in total (sum) units, which would be 0.921, we would get values of 32, 20 and 32 units for L, C and R. Our C measurement is off by 20%.

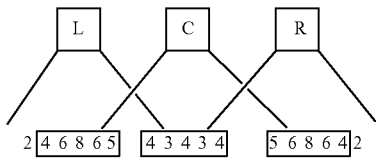

If we reverse the ratios, so that the C cone is 2× as bright as either R or L cones, a similar phenomenon occurs. The center peak which represents flashlight C is diminished, relative to the L and R flashlights, and after calibration the resulting values are 17, 31 and 17 units for L, C and R, respectively. The cumulative effect can be significant.

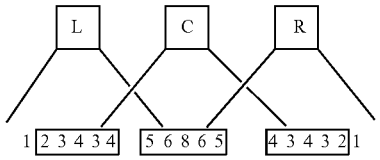

This effect is exacerbated by the fact that light striking the interference coating at any given point is composed of incident angles that range from zero to approximately 11.5°, the net result of overlapping emergence cones exiting the collimating faceplate. Assuming a relatively even distribution of incident angles, the effect is: (1) a widening of the passbands by upwards of 20%, making the half-peak bandwidth somewhere between 1.0 and 1.3+%; (2) an overall reduction in transmittance by upwards of 25%; and (3) a spectral "blue shift" of as much as 4+ nm. Moreover, because the shift in the spectrum is always to shorter wavelengths, regardless of the direction of the angle of incidence relative to the long axis of the sensor, and because the incident angle must be measured relative to the long axis only (whereas incoming light beams will have incident angles relative to both the long and short axis of the sensor), modeling the passband overlap using a Gaussian function (normal distribution) is at best an approximation that must be "tweaked" through experimentation.

Decoupling, or "deconvolving" the influence of overlapping passbands is possible, however. Take the above illustration of the three flashlight beams; in the first example, the actual light unit distribution was 32, 16, 32, but the recorded measurement was 32, 20, 32. Can we remove (or minimize) the impact of the overlap? First, we know that 12.5% of the light fell outside the target pixel area, so we begin by adding this light back, giving us values of 33, 21 and 33. To do this, and assuming a uniform distribution of light, divide the measured value by the percent of total light (or total area) captured by the pixel; in this case, 29/0.875=33 and 18/0.875=21.

Next, subtract the overlap of neighboring pixels. In the case of L and R, that would be 33−1=32. In the case of C, that would be 21−4=17. To understand how these values are derived, consider the following: the overlap (total light falling on adjacent pixels) is 12.5%, half of which falls on the left adjoining pixel and half on the right (6.25% to each side). The adjusted, measured L and R values were 33×0.0625=2 (after rounding to the nearest integer), and the C value 21×0.0625=1. Pixel C is influenced by both pixels L and R, so after adjusting C to account for the light falling outside its active pixel area (adjusted from a value of 18 to 21), we subtract the overlap light from both L and R, thus 21−2−2=17. L and R, however, are influenced only by pixel C (otherwise their values would be higher), thus 33−1=32. The deconvolved recorded measurement is therefore 32, 17 and 32, yielding a much closer approximation of the original values. If we apply the same approach to the second example, where the C luminance is 2×L and R, the result (after rounding) is 16, 32, 16, a match to the original values.

Each point along the etalon is defined by its percent transmittance (% T) of the desired wavelength (in-band), and its percent blocking of all other wavelengths (out-of-band). Both specifications describe transmittance: in the case of desired wavelength, a higher transmittance value is better; in the case of undesired wavelengths, lower is better. A suitable specification calls for the in-band transmittance to be >40 percent, and out-of-band transmittance to be <0.1 percent (average, <0.5 absolute). Generally speaking, in-band transmittance increases as the wavelength increases, whereas out-of-band transmittance remains relatively constant. Out-of-band energy is effectively noise; it is a small percentage of the entire spectrum of light striking the sensor. Out-of-band blocking or elimination requires an understanding of how the photodiode array responds to out-of-band energy relative it how it responds to in-band energy at any given point.

Figure 6:
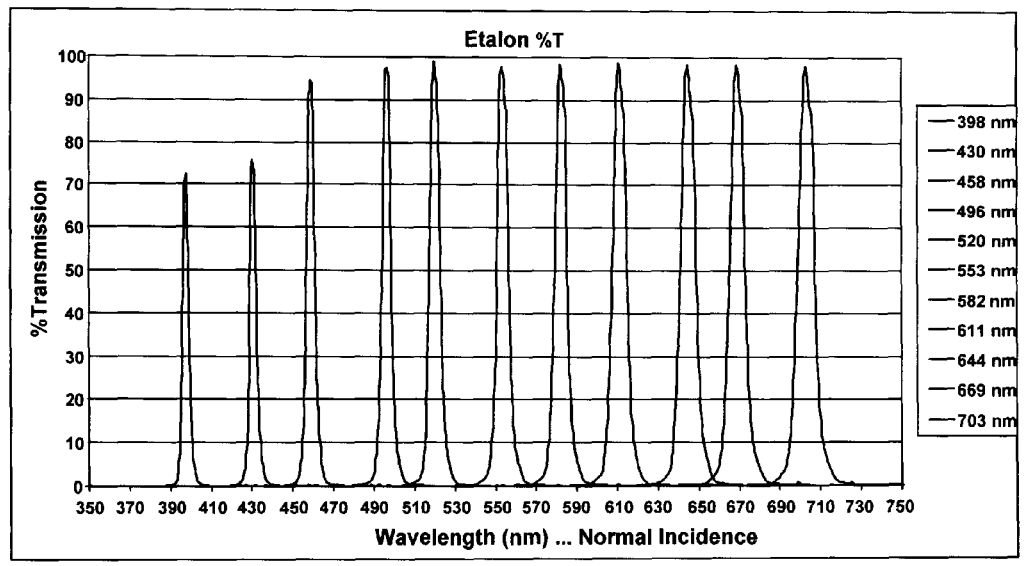
FIG. 6 is a graph of etalon transmittance as a function of wavelength.

The first step to identifying out-of-band (OOB) noise is to map percent transmittance across the etalon face, yielding a set of values we will collectively call % Te. Typically, we begin with three data points: one each for red, green and blue (determined at time of filter inspection by the fabricator). These we will call % Te(r), % Te(g) and % Te(b). Each of these three values will map to a specific wavelength: $\lambda$Te(r), $\lambda$Te(g), $\lambda$Te(b). To derive transmittance for all other wavelength points along the etalon, we can fit a curve using a Bézier function. This is an approximation, and assumes that the change in transmittance follows a relatively smooth transition. Also, we can measure multiple points, and define each as % Te($\lambda$), as shown in FIG. 6. Here, we have identified 11 points, where $\lambda$ would be 398, 430, 458, 496, 520, 553, 582, 611, 644, 669 and 703 nm. For example, % Te(553)= 0.977496. The more points we have, the better we can estimate both in-band transmittance and half-peak bandwidth. In the case of % Te(553)hpbw=1.11 percent, or 6.137 nm, which translates into 6.137/0.0395=155.37 μm.

Figure 7:
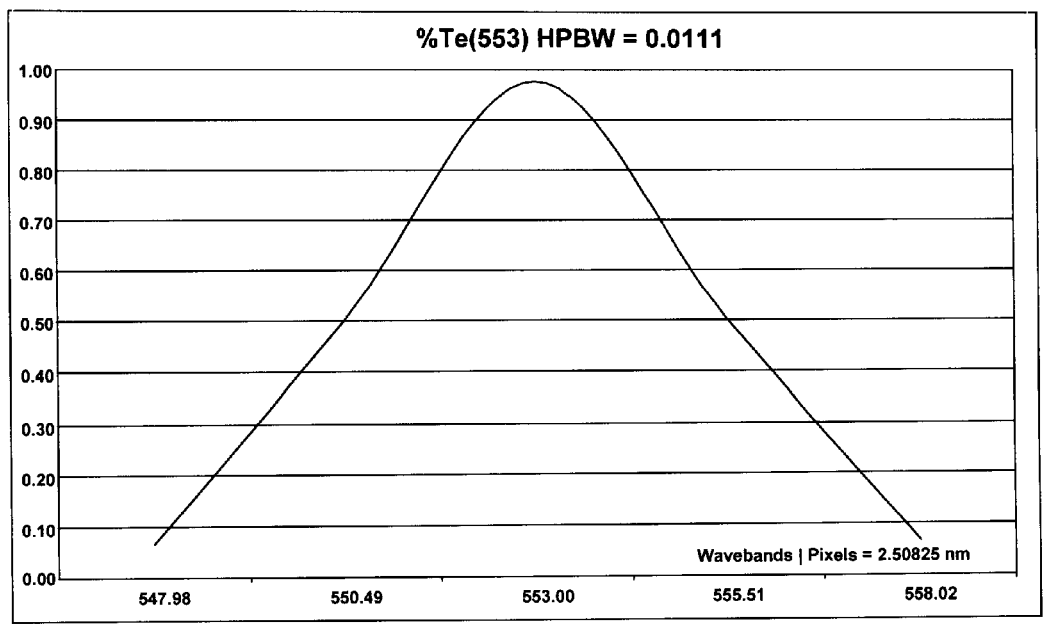
FIG. 7 illustrates a Gaussian distribution for a particular waveband useful in the description of the method of the present invention.

Referring to FIG. 7, a Gaussian distribution is shown for the 553 nm waveband, with a half-peak bandwidth of 1.11 percent. Assuming 553 nm was the center wavelength for a given pixel (for purposes of description—this exact wavelength is not likely to be selected) the light energy would spread across five pixels, with the bulk of the energy concentrated on pixels P(0), P(+1) and P(−1), which in the above plot are pixels 553.00, 555.51 and 550.49. This also assumes a zero angle of incidence for the incoming light. The total distribution of transmitted light for P(0) in this case is 46.12 percent, and for P(+1) and P(−1) is 23.64 percent each. Pixels P(+2) and P(−2) capture 3.19 percent each, and 0.22 percent falls to pixels to either side further beyond. If we take into account imperfect transmission, and inactive pixel area (the 8 μm gaps between the pixels), the absolute distribution becomes P(0)=40.44, P(+1) and P(−1)=20.73 each, P(+2) and P(−2)=2.79, gap=10.07 percent, reflected=2.25 percent, and unaccounted for (falling on pixels beyond ±2) is 0.20 percent.

The formula to calculate the Gaussian function for any given waveband, is as follows (in pseudo code):

$$\exp((-1*((\lambda-(\lambda i*\lambda o))-\lambda)^2)/((\lambda hpbw/2)^2))\ldots$$

where $\lambda$=pixel center wavelength; $\lambda$i=pixel interval in nm; $\lambda$o=pixel offset (+1, +2, etc.); and, $\lambda$hpbw=half-peak bandwidth in nm (or percent HBPW multiplied by $\lambda$). This would be done for each pixel, for the total number of pixel offsets deemed necessary. For $\lambda$<800 nm, ±3 pixels should be sufficient to account for >98 percent of the total radiant energy for each pixel center waveband.

To implement this portion of the method, we first decide in advance the number of pixels to offset the pixel of interest. For the visible spectrum, ±3 pixels should be sufficient. However, a greater number of offset pixels can be used, and the pixel-offset value can be made variable to optimize the efficiency and accuracy of the method. For each pixel, assuming a fixed ±3 offset pixels, the method would be as follows:

```
Psum[λ]=0;
for (λo=(−3); λo<=3; λo++) {
Ptmp1=exp((−1*((λ−(λi*λo))−λ)^2)/((λhpbw/2)^2));
Ptmp2=Ptmp1*P[λ];
Psum[λ]+=Ptmp2;
}
```

In the above example, Psum[$\lambda$] is a floating point array equal to the number of pixels comprising the sensor; and P[$\lambda$] is a second floating point array containing the values returned by the A/D converter for each pixel of the sensor, converted to the range 0;1. Note that P[$\lambda$] must remain unaltered by the method, as it is used again. The next step is to subtract the influence of neighboring pixels, as is accomplished by the following:

```
for (λo=(−3); λo<0; λo++) {
Ptmp1=exp((−1*((λ−(λi*λo))−λ)^2)/((λhpbw/2)^2));
Ptmp2=Ptmp1*P[λ+λo];
Psum[λ]−=Ptmp2;
}
for (λo=1; λo<=3; λo++) {
Ptmp1=exp((−1*((λ−(λi*λo))−λ)^2)/((λhpbw/2)^2));
Ptmp2=Ptmp1*P[λ+λo];
Psum[λ]−=Ptmp2;
}
```

Figure 8:
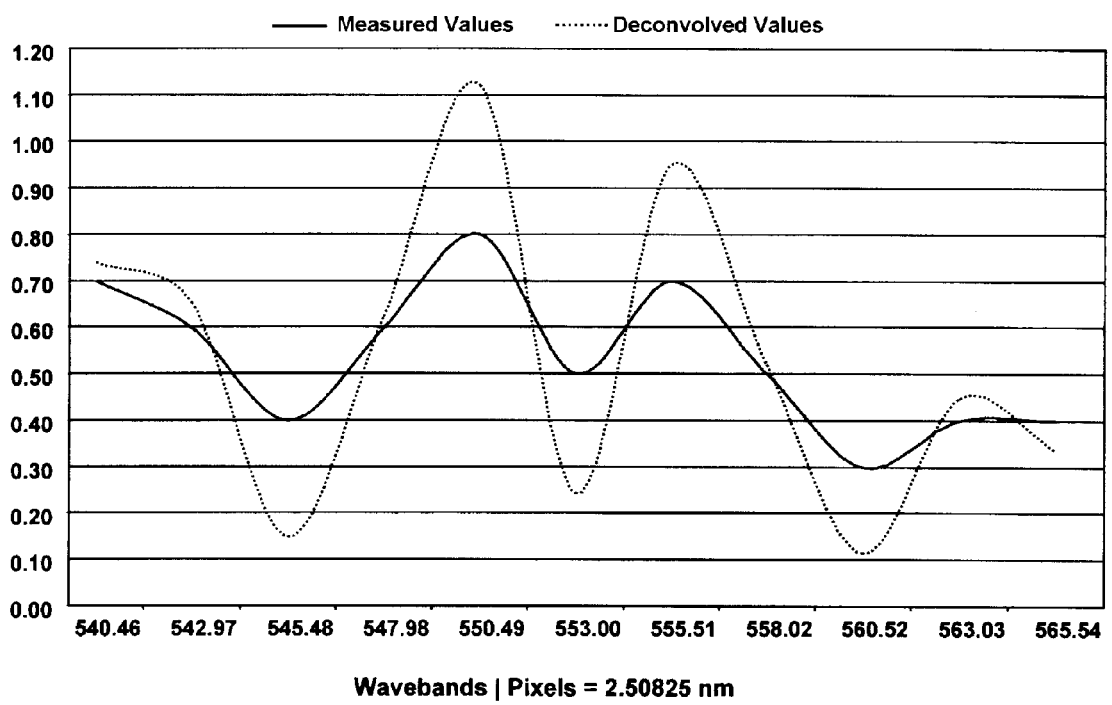
FIG. 8 is a graph comparing measured values of wavebands compared to deconvolved values of the same wavebands.

Note that we must do this in two steps to avoid subtracting the original value of the pixel P[$\lambda$] from itself (which would be $\lambda$o=0). An example of this method (albeit somewhat extreme) is shown in FIG. 8; in this example, the total energy represented by these 11 pixels is exactly the same for both plot lines (5.9) as is the average (0.5364).

To summarize the process of pixel deconvolution, we start by calculating the ratio of the passband captured by the target pixel to the passband captured by adjacent pixels. We use a Gaussian function to calculate the amount of light to "add back" to the amount reported by the target pixel. This is the first pass of the method. In the second pass, we subtract from the target pixel what was added to the adjacent pixels. The net result is a redistribution of the overlapping passbands and a "sharpening" of the spectral data.

Pixel responsivity is a potential issue when calculating the deconvolution values. In the first pass, the portion of the passband overlapping adjacent pixels is recovered; as such, the passband wavelength recovered for the target pixel from adjacent pixels is the same as the center wavelength of the target pixel. However, in the second pass, passband overlap from adjacent pixels is subtracted from the target pixel value; the passband wavelength will match that of the adjacent pixel to which the overlap belongs, not the target pixel. Pixel responsivity is wavelength dependent; so if light of two different wavelengths (one short, one long) is projected in equal proportion onto the same pixel, pixel response will be weighted, typically, toward the longer wavelength. To compensate for this phenomenon, we can modify the second pass of the method as follows:

```
Psum[λ]/=% Rs[λ];
for (λo=(−3); λo<0; λo++) {
Ptmp1=exp((−1*((λ−(λi*λo))−λ)^2)/((λhpbw/2)^2));
Ptmp2=Ptmp1*(P[λ+λo]/% Rs[λ+λo]);
Psum[λ]−=Ptmp2;
}
for (λo=1; λo<=3; λo++) {
Ptmp1=exp((−1*((λ−(λi*λo))−λ)^2)/((λhpbw/2)^2));
Ptmp2=Ptmp1*(P[λ+λo]/% Rs[λ+λo]);
Psum[λ]−=Ptmp2;
}
Psum[λ]*=% Rs[λ];
```

In the above code snippet, % Rs[$\lambda$] is an array containing normalized responsivity data for the photodiode array. Responsivity data is wavelength dependent, and must be extrapolated from data provided by the array manufacturer. What is different in this code snippet as compared with the previous example, is that Psum[$\lambda$] is adjusted for pixel responsivity, and P[$\lambda$] of the adjacent pixels is similarly responsivity weighted. This ensures the correct ratio of passband overlap is subtracted from the target pixel for each of the six adjacent pixels. Once this is done, the final step is to multiply Psum[$\lambda$] by % Rs[$\lambda$] to reset the pixel to what should have been its un-weighted value.

Before we can begin the process of deconvolving the raw spectral data, we must determine center wavelengths of the respective pixels. We first map the raw pixel values to pixel center wavebands, which we will collectively call P[$\lambda$]. We can start with the assumption that the center of the etalon is 550 nm, and that the span of the array is 63.5 µm×128 pixels in our example=8,128 µm. The etalon is effectively an interference filter wedge, thus it has a slope that, for this application is defined as 0.0395 nm/µm. Divide the length of the array span by two, multiple by the slope and the end point wavelengths are 389.47 and 710.53 nm. However, because we want the center wavelength for each pixel, we need to adjust the calculation slightly. There are 128 pixels in our example, each 55.5 µm wide, and 127 gaps between the pixels, each 8 µm wide. Thus, the actual span is 8,120. Likewise, the center point for pixels 1 and 128 are 27.75 µm from their respective edges. This gives us a "span of interest" or active area span of 8,064.5 µm. The center-point end points are therefore 390.74 and 709.27 nm, making the active wavelength span 318.54 nm (which can also be derived by multiplying 8,064.5 by the slope of 0.0395). The center-to-center distance between pixels is 63.5 µm, or 2.508 nm.

Figure 9:
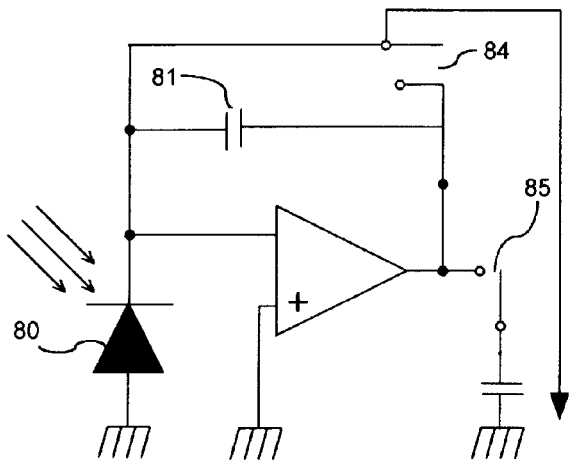
FIG. 9 is a simplified circuit diagram of a typical charging circuit for charging a capacitor to convert a charge to a digital value.

Each pixel in the array is combined with a capacitor. Prior to taking a spectral measurement, the capacitors are fully discharged. When taking a measurement, current flowing through a given pixel in response to luminous energy, will charge its corresponding capacitor; at the end of the measurement cycle (typically less than 100 ms) an analog-to-digital converter (ADC) is momentarily connected to each capacitor in sequence, and the charge associated with said capacitor is converted to a digital value. Referring to FIG. 9 a simplified circuit diagram of a typical charging capacitor arrangement is shown connected to a pixel in an array. Circuits for converting charge values on capacitors charged from photodetector sources and converting such charge values to digital equivalents are well known in the art and need not be described here. Typically, and in a very simplified form, FIG. 9 represents a photodetector 80 connected to a corresponding charging capacitor 81. Light energy striking the photodetector results in current flowing from the photodetector to charge the capacitor. Periodically, the charge on the capacitor is connected through a switch 84 to a suitable analog-to-digital conversion circuit to derive a digital value corresponding to the analog value of the capacitor charge. A raw pixel array receives and temporarily stores the values associated with each pixel. Upon completion of the detection cycle, switch 85 is closed to discharge the capacitor 81 and the cycle is then repeated.

A higher numeric (ADC) value corresponds to a greater electrical charge, which in turn corresponds to more light striking the photodiode over the length of the measurement cycle (i.e. more photons=more electrons). If no light enters the aperture cone, the pixels will remain dark and (in theory) no current will flow to the capacitors. However, a small amount of current will "leak" into the capacitors, resulting in a small charge on each that will grow over time; this will result in a very low numeric value being returned by the ADC for each capacitor. Further, a very small amount of noise inherent in the imaging circuit will result in a very small, but relatively stable voltage being present on the ADC for each pixel. This is referred to as dark current (DC) because no light enters the aperture (the sensor is dark). This excludes stray light, internal "cone" reflections and ambient light contamination (see below).

Dark current is actually the combined imager+ADC noise "floor" and accumulated charge over time. For a typical 100 ms sample, the average DC is two percent for a typical sensor, with an average standard deviation of less than 0.02. This equates to approximately 69 mV of signal in a range of 3.3 V, with an average fluctuation pixel-to-pixel of approximately 1 mV (this fluctuation is equivalent to <±1 LSB of the ADC). At 1000 ms, 10× the typically sample interval, repeated testing has shown the dark current signal to increase by only about 15 percent on average, to typically around 80 mV. Because this noise floor is very stable for a given sample period, and because the change over time (and with temperature) is likewise very stable, it is recorded at time of factory calibration, and checked automatically (transparently to the user) each time a white calibration is performed (compared against the factory calibration). This is one metric used to ensure a given instrument is performing within stated specifications.

Figure 10:
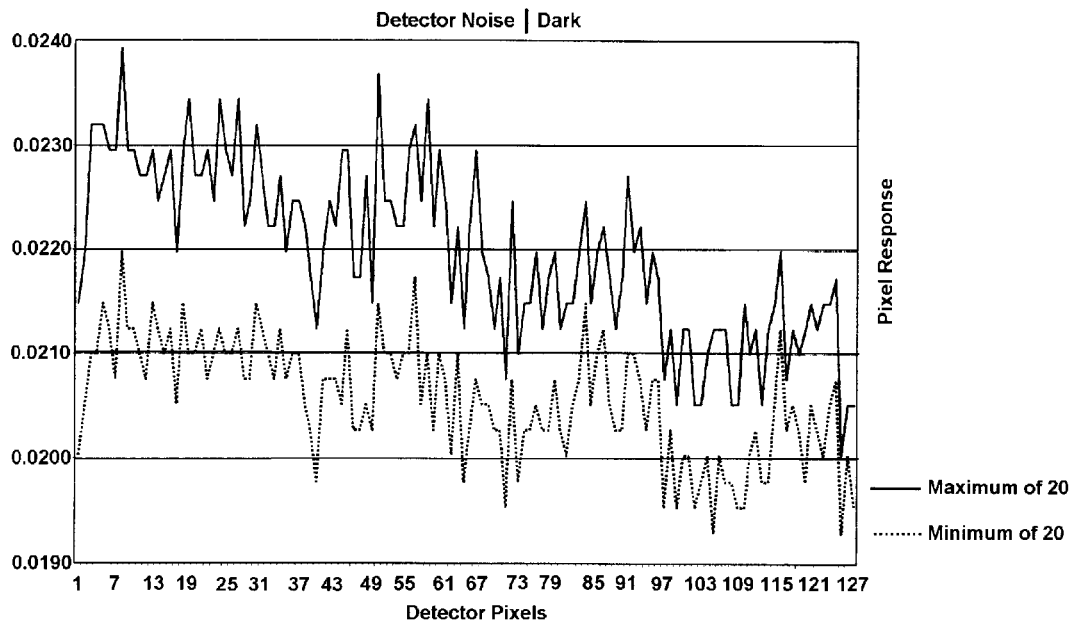
FIG. 10 shows a typical noise signal, the accumulated average of twenty samples.

FIG. 10 shows a typical noise signal, the accumulated average of 20 samples of 100 ms duration each, over a span of approximately four seconds (100 ms on, 100 ms off, repeated 20 times). This data is written to an EEPROM on the sample module at time of manufacture; each time a measurement is taken, this data is subtracted from the raw sensor data (the values for each pixel returned by the ADC). The function is P[$\lambda$]−=DC[$\lambda$]; where DC[$\lambda$] is an array containing the factory dark current values stored in EEPROM and copied to RAM on module power-up.

As described previously, any given point along the etalon is defined by its percent transmittance (% T) of a given wavelength (in-band), and its percent blocking of all other wavelengths (out-of-band). Unlike passband bandwidth, which is a pixel-dependent function, out-of-band "noise" affects all pixels equally. For a typical sensor, the average out-of-band blocking is 99.9 percent (99.5 percent absolute) of the total light striking the sensor face at that point. As such, the ratio of out-of-band energy to in-band energy for any given point can vary greatly; we can think of this as noise (luminous noise) and the ratio of in-band to out-of-band luminous energy as the luminous signal-to-noise ratio for a given pixel; as a photoelectric device, the pixel is impacted by both luminous and electrical noise. To determine the level of out-of-band noise, the first step is to determine the total amount of light striking the sensor across all pixels. We can assume the light is uniformly distributed. P[$\lambda$] is the pixel value returned by the ADC; this represents the total energy striking the pixel (determined indirectly by measuring the charge on the capacitor associated with said pixel). Poob[$\lambda$]=P[$\lambda$]−DC[$\lambda$] removes the influence of dark current, which is electrical noise (independent of luminous noise) associated with the capacitor.

Poob[$\lambda$]/=% TNe[$\lambda$] compensates for light transmission through the etalon. The pixel values P[$\lambda$] returned by the ADC represent unique wavebands, each a unique point along the etalon. In-band light transmission efficiency decreases with shorter wavelengths, but out-of-band light transmission (blocking efficiency) should be independent of wavelength. % TNe[$\lambda$] is the normalized transmittance data for the etalon, as opposed to absolute transmittance % TAe[$\lambda$], which would be an estimate of the total light striking the etalon, including reflected light which does not contribute to out-of-band noise. Thus, the sum of Poob[$\lambda$] should be the total luminous energy striking each pixel portion of the etalon (sans reflected energy), which would be described as OOB=$\Sigma$Poob[$\lambda$].

Note that OOB is not an estimation of the total energy striking the etalon, but instead just 1/128 of said energy. The reason for this is that, in calculating OOB we added the waveband energy associated with each pixel, but each pixel is 1/128 of the total active sensor area. To get an estimate of total luminous energy, we would need to multiply each pixel value by 128 and sum that total (or multiple the total by 128). Either way, we need OOB to represent the out-of-band of a single pixel, thus OOB/=% Re where % Re is the average out-of-band transmission for any point along the etalon (0.1 percent, on average) is the luminous noise associated with any given pixel.

The next step is to subtract the out-of-band noise OOB from the raw pixel values, P[λ]. However, before we can do this, we again need to consider pixel responsivity. Consider two pixels, one positioned at a center wavelength of 450 and the other at 650 nm. Pixel response to light at 450 nm is 0.63135 versus 0.95024 for light at 650 nm. If these two pixels report the same ADC value, for example 0.45, there must be 33.6 percent more luminous energy in the 450 nm waveband than in the 650 nm band; otherwise, the pixel response would be lower for the 450 nm pixel if the luminous energy was equal at both wavelengths. The luminous noise for both pixels is the same, however, which is the value of OOB calculated above; this represents all wavebands, therefore the pixel response to the noise is identical for both the 450 and 650 nm pixels.

For example, we can make the OOB value 0.005, equivalent to approximately 0.17 mV/ms. Using response-adjusted voltage, we can calculate luminous energy in absolute terms. The response-adjusted voltage for the 450 nm pixel in this example would be 0.45/0.63135=0.71278×3300 mV=2352/100 ms=23.52 mV/ms. And, for the 650 nm pixel, the value would be 0.45/0.92024=0.489×3300 mV=1614/100 ms=16.14 mV/ms. If we then subtract OOB we get 23.35 and 15.97 respectively for 450 and 650 nm; this should be an accurate estimate of the in-band luminous energy for both pixels. If, however, we subtract OOB directly from the P[λ] for the two pixels, the results are not equivalent. Consider 450 nm, 0.45−0.005=0.445/0.63135=0.70484×3300=2326/100=23.26 mV/ms. And, for 650 nm, 0.445/0.92024=0.48357×3300=1596/100=15.96 mV/ms. In-band luminous energy for the 450 nm pixel, and to a lesser extent for 650 nm, is under-reported.

To ensure in-band energy is calculated correctly, without the need to convert all values to mV/ms, the raw pixel value P[λ] must be adjusted to account for pixel response prior to subtracting OOB. Thus, the proper calculation would be 0.45/0.63135=0.71276×3300 mV=2352/100 ms=23.52−0.17=23.35 mV/ms. Alternatively, the calculation can be simplified, 0.45−(0.005*0.63135)=0.44684, or Ppb[λ]=P[λ]−(OOB*% Rs[λ]). We can test function this with the following calculation: 0.44684/0.63135=0.70775, which, converted to mV/ms, is 0.70775×3300=2335/100=23.35 mV/ms, the correct value.

At this point, we can describe an application of the deconvolution method, and the order in which the above elements are applied. Because the data we will be manipulating represents the measured electrical charge on the capacitors coupled to the sensor array, and not the actual light striking the sensor itself, we need to begin by eliminating dark current. In this case, the value P[λ] is a floating point array used to store the pixel values reported by the ADC, and DC[λ] is a floating point array used to store the dark current values written into EEPROM at time of manufacture, as part of the calibration process. Thus, P[λ]−=DC[λ] yields noise canceled pixel data.

The next step is to calculate out-of-band luminous noise, where Poob[λ]=P[λ]/% TNe[λ] as previously described, followed by, OOB=ΣPoob[λ] and OOB/=(PC/% Re) where % Re is the percent out-of-band transmittance, and PC is the number of pixels comprising the imaging array. Now, we eliminate luminous noise as Ppb[λ]=(P[λ]−(OOB/% Rs[λ]))*% Rs[λ], where Ppb[λ] is the passband value of the pixel, less noise (both luminous and electrical). At this stage, we can deconvolve the pixel values.

The pseudo source code to this point would be as follows:

```
FLOAT OOB = 0;              // Initialize OOB
FLOAT Psum[λ] = 0;          // Initialize Psum[λ] array
FLOAT %Re = 0.001;          // Etalon out-of-band % transmittance
INT16 Tms = 0;              // Initialize sample interval
for (λ = 0; λ < 128; λ ++ ) {
    P[λ] −= DC[λ];
    Poob[λ] = P[λ] / %TNe[λ];
    OOB += Poob[λ];
}
OOB /= %Re;
for (λ = 0; λ < 128; λ ++ )
    Ppb[λ] = P[λ] − (OOB * %Rs[λ]);
for (λ = 0; λ < 128; λ ++ ) {
    for (λo = (−3); λo <= 3; λo ++ ) {
        Ptmp1 = exp((−1 * ((λi * λo)) − λ) ^ 2) / (( λhpbw / 2) ^ 2));
        Ptmp2 = Ptmp1 * Ppb[λ];
        Psum[λ] += Ptmp2;
    }
    Psum[λ] /= %Rs[λ];
}
for (λ = 0; λ < 128; λ ++ ) {
    for (λo = (−3); λo < 0; λo ++ ) {
        Ptmp1 = exp((−1 * ((λ − (λi * λo)) − λ) ^ 2) / ((λhpbw / 2) ^ 2));
        Ptmp2 = Ptmp1 * (Ppb[λ + λo] / %Rs[λ + λo]);
        Psum[λ] −= Ptmp2;
    }
    for (λo = 1; λo <= 3; λo ++ ) {
        Ptmp1 = exp((−1 * ((λ − (λi * λo)) − λ) ^ 2) / ((λhpbw / 2) ^ 2));
        Ptmp2 = Ptmp1 * (Ppb[λ + λo] / %Rs[λ + λo]);
        Psum[λ] −= Ptmp2;
    }
}
```

At this stage in the code, Psum[λ] should hold the noise-free, deconvolved pixel values. Regarding the method, deconvolving the first three and last three pixels requires some adjustment of the data. The above loop would require 134 total pixels, from −3 to 130. Because the P[λ], Ppb[λ] and Psum[λ] arrays are each only 128 elements in size, this would result in a memory read error on most platforms. Therefore, for pixel 0 we would subtract the overlap values of pixels 1, 2 and 3 twice; pixel 1 would subtract pixel 0 and 2, plus pixels 3 and 4 twice; and, pixel 2 would subtract pixels 0, 1, 3 and 4, plus 5 twice. On the opposite end of the array, pixel 125 would subtract the overlap values of pixels 123, 124, 126 and 127, plus 122 twice; pixel 126 would subtract 125 and 127, plus 123 and 124 twice; and, pixel 127 would subtract pixels 124, 125 and 126 twice.

The last step is to adjust Psum[λ] to account for pixel responsivity+absolute transmittance of the etalon+the effect of additional optics that may be employed in the using system such as a spectral flattening/NIR blocking filter, % Tf[λ]. Also, we need to convert to an absolute value, in this case mV/ms, which is PVs[λ]. To do this, we need to first multiply each pixel value by 128 to derive the total luminous energy for each waveband across the entire sensor, then multiple by 3300 (maximum voltage in mV for the ADC analog input), then divide by the sampling interval.

The final step of the method (at least for emissive samples) would be:

```
Tms = GETSAMPLEINTERVAL( );      // sample interval in milliseconds
for (λ = 0; λ < 128; λ ++ ) {
    Ppb[λ] /= (%TAe[λ] * %Tf[λ]);
    PVs[λ] = (Ppb[λ] * 128 * 3300) / (Tms * 1000)
}
RECORD(PVs[λ]);
```

Examples of this method applied in Microsoft Excel follow. These are emissive samples taken of a HP Pavilion zd7000 laptop display of 400 nits (candela per square meter). For these examples, we used an out-of-band blocking of 99.87 percent (0.0013) and a half-peak bandwidth of 1.3 percent (0.013). These values attempt to take into account the impact on blocking efficiency and bandwidth as a result of non-zero angles of incidence (see above).

Figure 11:
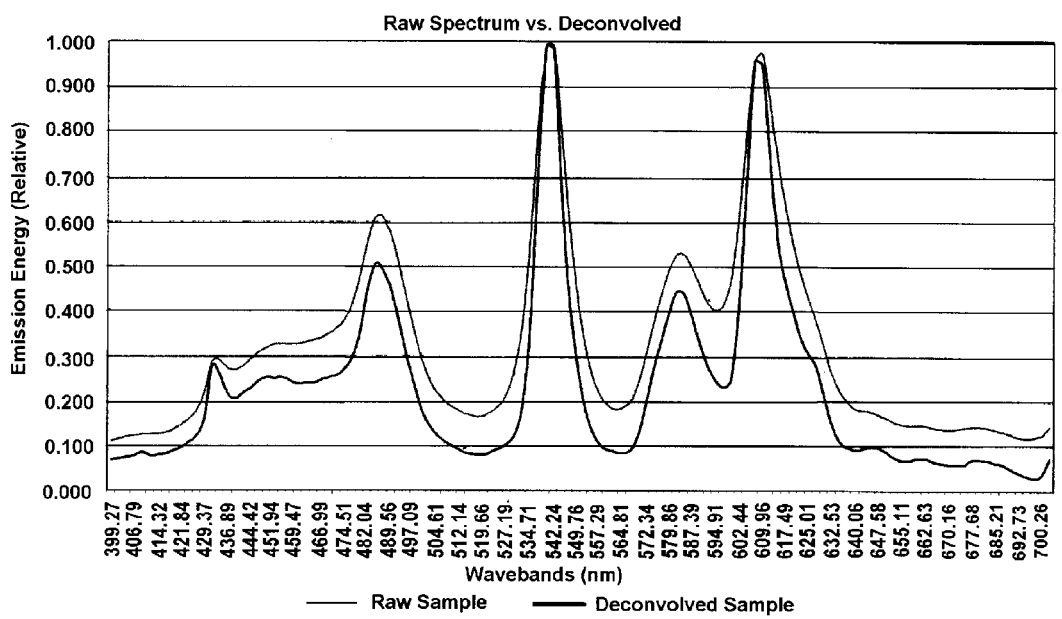
FIG. 11 is a graph showing a sample implementation of deconvolved data.

FIG. 11: This sample, of a white square centered on the display, is of 900 ms duration. The deconvolved data shows a well defined peak at 582 nm, and a very well defined peak at 432 nm.

Figure 12:
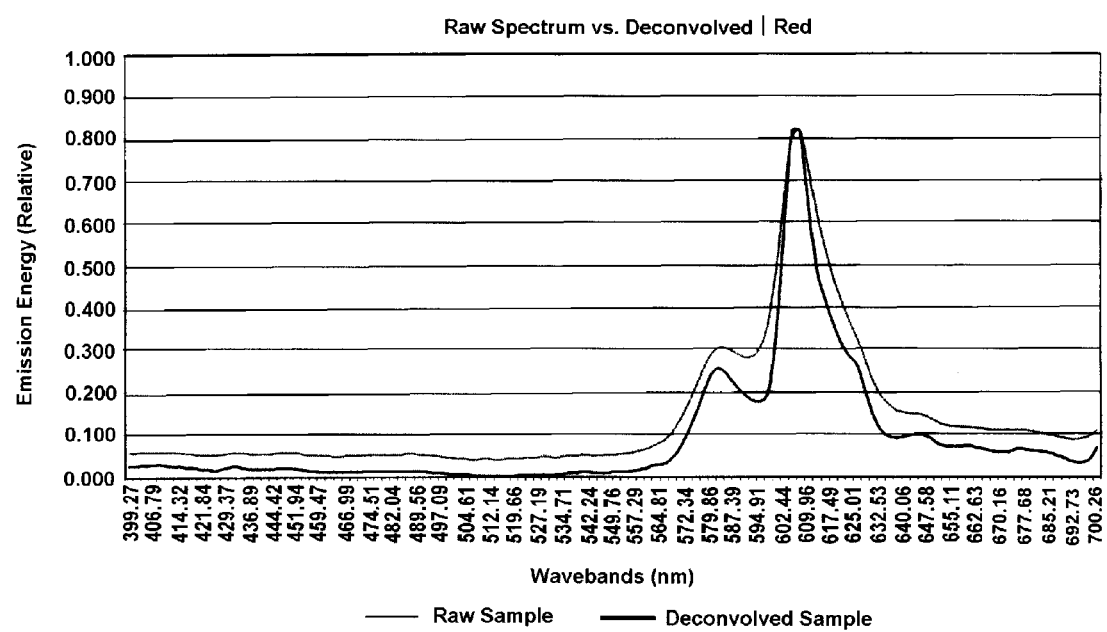
FIG. 12 is another sample of the implementation of the method of the present invention showing the comparison of a raw sample to a deconvolved sample.

FIG. 12: This sample, of a red square centered on the display, is of 1 s duration.

The process for handling reflective samples is very similar to that of emissive samples, there are simply additional iterations required. An emissive sample can be thought of as having the following components:

1. Illuminant energy, which is the spectral output of the light source used to illuminate the sample area.
2. Reflected sample energy, which is the illuminant energy reflected from the sample area.
3. Internal cone reflections (i.e. noise), which is the illuminant energy reflected from inside the aperture cone.

The first step in handling reflective samples is to measure the internal cone reflections by aiming the aperture cone into a light trap and measuring the reflected energy. Black glass light traps, such as those from Avian Technologies (www.aviantechnologies.com/products/standards) are typically >99.8 percent efficient. After making the sample, perform the deconvolution steps as described above for an emissive sample, and store the results in EEPROM.

The second step is to measure the illuminant energy by sampling a diffuse white reflectance standard (such as a white fluorilon puck). Apply the same deconvolution steps as described above; note that the sampling interval for this and for the measurement of cone reflections should the same. Next, if we assume that approximately 0.1 percent of the illuminant energy output when we made our cone reflections measurement, reflected back from the light trap, multiply the internal cone reflection values in EEPROM by 0.999 and subtract those values from the illuminant energy values (this is only valid for the illuminant energy values). This will remove the influence of the cone reflections. Finally, divide the resulting illuminant energy values by the known spectral reflectance values for the white reflectance standard used (after interpolating said spectral reflectance wavelengths to match the waveband center wavelengths represented by the illuminant energy values) and store the results in EEPROM.

Figure 13B:
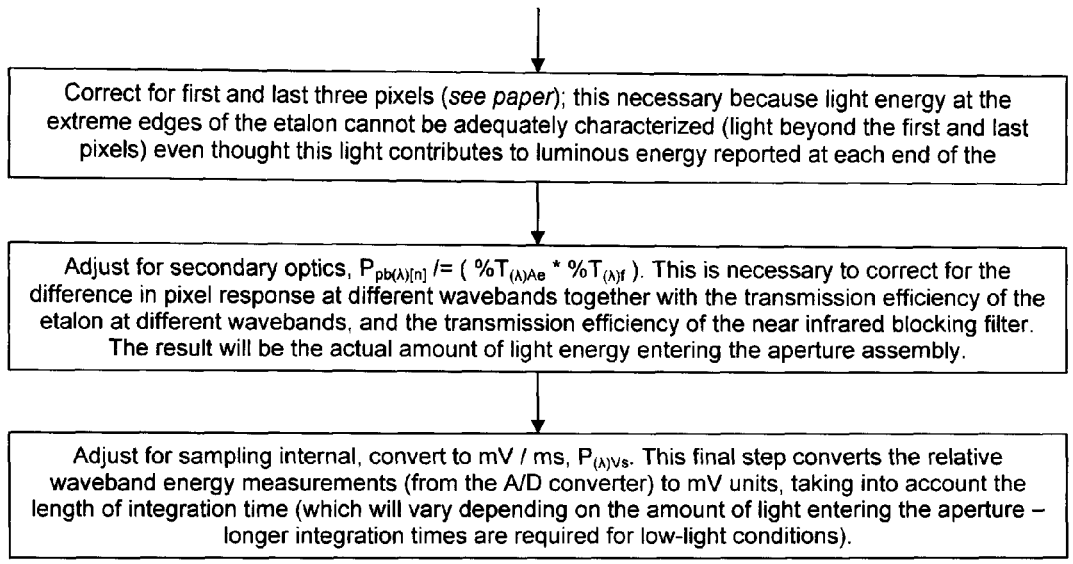

Referring to FIGS. 13A and 13B, a process for the handling of spectral data is shown including the method of the present invention to deconvolve the collected spectral data. Raw pixel values are obtained as previously described and are stored in a pixel array. Dark current, out-of-band luminous noise, and total out-of-band quantities are calculated and adjust the stored pixel values in the pixel array. The spectral responsivity of the photodiode array, which may have been derived in advance, is obtained, to take into account the relative responsivity of any given pixel that is positioned in the pixel array along the length of the linearly variable bandpass filter or etalon. The values stored in the respective pixels of the pixel array are then deconvolved utilizing the method of the present invention to add to the pixel value an amount to compensate for energy lost to neighboring pixels while subtracting from the pixel value energy received that was intended for neighboring pixels.

The correction may then be made for the fact that the first and last three pixels are at or close to the end of the linear pixel array and do not receive the influence from the same number of neighboring pixels as those more centrally located on the array. The values may then be adjusted for any secondary optics incorporated in the system. The sampling interval or frequency is then adjusted to obtain proper units. The implementation of the deconvolution as described above enhances the accuracy of the data presentation resulting from the analysis of the spectral data.

What is claimed:

1. A method of deconvolution of spectral data comprising:
   (a) directing light to be analyzed through a collimator onto a linearly variable bandpass filter;
   (b) directing light from the linear variable bandpass filter onto a plurality of photodetectors arranged in a linear array; each photodetector positioned with respect to the linearly variable bandpass filter to receive a predetermined bandpass;
   (c) providing a plurality of capacitors each corresponding to a different one of said photodetectors for accumulating a charge proportional to the light energy received by the corresponding photodetector;
   (d) converting the charge value on each capacitor to digital data and storing said digital data in a pixel array; and
   (e) correcting the digital data by adding an amount to each stored value corresponding to the proportion of a photodetector's passband captured by adjacent photodetectors, and subtracting an amount from each stored value corresponding to the amount added to adjacent photodetectors.

2. The method of claim 1 wherein the digital data is modified to compensate for the relative responsivity of each photodetector before the data is corrected.

3. In a system for spectral analysis having means for receiving light and producing a digital representation of said received light, a method for improving the accuracy of said representation comprising:
   (a) directing said received light onto a linearly variable bandpass filter;
   (b) directing light from said linearly variable bandpass filter onto a plurality of photodetectors, each positioned to receive light of a different predetermined passband to generate an electrical charge corresponding to each photodetector;
   (c) converting the electrical charges into digital format for temporary storage to provide a temporary digital value corresponding to each photodetector respectively;
   (d) adding to the value of the stored value corresponding to each photodetector an additional amount corresponding to the percentage of light of said predetermined passband that was received by adjacent photodetectors; and
   (e) subtracting from the stored charge corresponding to each photodetector an amount corresponding to the value added to each of the adjacent photodetectors.

4. The method of claim 3 including the step of calculating spectral responsivity for each of said plurality of photodetectors and correcting the temporary storage of the digital value corresponding to each of said photodetectors.

5. A method for improving the analysis of spectral data comprising directing light units through a linearly variable bandpass filter, positioning photodetectors at predetermined locations adjacent to the linearly variable bandpass filter to intercept light emanating therefrom, each photodetector having a predetermined passband; converting the light units striking each photodetector into digital data and temporarily storing the digital data; adding to the digital data for each photodetector an amount corresponding to the light units in a selected photodetector's passband striking adjacent photodetectors; subtracting from the data stored for each photodetector an amount corresponding to the amount added to adjacent photodetectors.

6. A method of deconvolution of spectral data comprising: sampling each pixel of a photodiode array to obtain raw pixel values; converting the raw values to digital representations and storing the digital representation in a raw pixel array; calculating the passband for each pixel by adding to each pixel value an amount to compensate for energy lost to neighboring pixels and subtracting from each pixel value an amount to compensate for energy received in passbands of neighboring pixels.

7. A method of deconvolution of spectral data comprising:
(a) directing light to be analyzed through a collimator onto a linearly variable bandpass filter;
(b) directing light from the linear variable bandpass filter onto a plurality of photodetectors arranged in a linear array; each photodetector positioned with respect to the linearly variable bandpass filter to receive a predetermined bandpass;
(c) providing a plurality of capacitors each corresponding to a different one of said photodetectors for accumulating a charge proportional to the light energy received by the corresponding photodetector;
(d) converting the charge value on each capacitor to digital data and storing said digital data in a pixel array;
(e) updating said digital data to compensate for dark current;
(f) compensating the value stored in said pixel array to compensate for out-of-band noise;
(g) calculate spectral responsivity of each of the photodetectors and modifying the charge value stored in said pixel array corresponding to each photodetector; and
(h) correcting the digital data by adding an amount to each stored value corresponding to the proportion of a photodetector's passband captured by adjacent photodetectors, and subtracting an amount from each stored value corresponding to the amount added to adjacent photodetectors.

\* \* \* \* \*